(12) United States Patent
Dent

(10) Patent No.: US 9,634,552 B2
(45) Date of Patent: Apr. 25, 2017

(54) SOLID-STATE PHASE SPLITTING TRANSFORMER

(71) Applicant: Paul Wilkinson Dent, Pittsboro, NC (US)

(72) Inventor: Paul Wilkinson Dent, Pittsboro, NC (US)

( * ) Notice: Subject to any disclaimer, the term of this patent is extended or adjusted under 35 U.S.C. 154(b) by 52 days.

(21) Appl. No.: 14/808,838

(22) Filed: Jul. 24, 2015

(65) Prior Publication Data

US 2017/0025942 A1 Jan. 26, 2017

(51) Int. Cl.
*H02M 3/158* (2006.01)
*H02M 1/08* (2006.01)

(52) U.S. Cl.
CPC .................................... *H02M 1/08* (2013.01)

(58) Field of Classification Search
CPC .............................. H02M 3/156; H02M 3/158
USPC ................................................. 323/271, 282
See application file for complete search history.

(56) References Cited

U.S. PATENT DOCUMENTS

| | | | |
|---|---|---|---|
| 4,213,173 A | 7/1980 | Link et al. | |
| 8,415,937 B2 * | 4/2013 | Hester ................. | H02M 3/1582 323/271 |
| 2008/0136387 A1 * | 6/2008 | Bertele ............... | H02M 3/1582 323/282 |
| 2009/0108820 A1 * | 4/2009 | Mirea ................. | H02M 3/1582 323/271 |
| 2010/0052638 A1 * | 3/2010 | Lesso .................... | H02M 3/158 323/282 |
| 2011/0089843 A1 * | 4/2011 | Krapp .................. | H02M 3/156 315/192 |
| 2011/0089915 A1 * | 4/2011 | Qiu ....................... | H02M 3/156 323/271 |
| 2013/0127548 A1 * | 5/2013 | Popplewell ........... | H03F 1/0227 330/297 |
| 2013/0278235 A1 * | 10/2013 | Divan ...................... | G05F 1/12 323/282 |
| 2014/0333277 A1 * | 11/2014 | Ngo ...................... | H02M 3/158 323/284 |
| 2015/0311795 A1 * | 10/2015 | Yang .................... | H02M 3/156 323/271 |

FOREIGN PATENT DOCUMENTS

| | | |
|---|---|---|
| DE | 2728377 A1 | 1/1979 |
| FR | 2673010 A1 | 8/1992 |
| GB | 1261838 A | 1/1972 |

* cited by examiner

*Primary Examiner* — Jeffrey Sterrett
(74) *Attorney, Agent, or Firm* — Coats & Bennett, PLLC

(57) ABSTRACT

A solid state power transformer is described for converting an input power signal at a first phase or voltage to an output signal of a second voltage or opposite phase by the use of bidirectional solid state switches switched at a high carrier frequency to produce a double-sideband, suppressed-carrier representation of the input power signal, which is then synchronously demodulated using further similar switches to produce the desired output. It is further disclosed that multiple instances of the above with relative phase-staggering of the switching frequency may be operated in parallel and activated or deactivated according to output current demand to provide maximum efficiency over a wide range of current and power levels.

17 Claims, 12 Drawing Sheets

Measuring the current

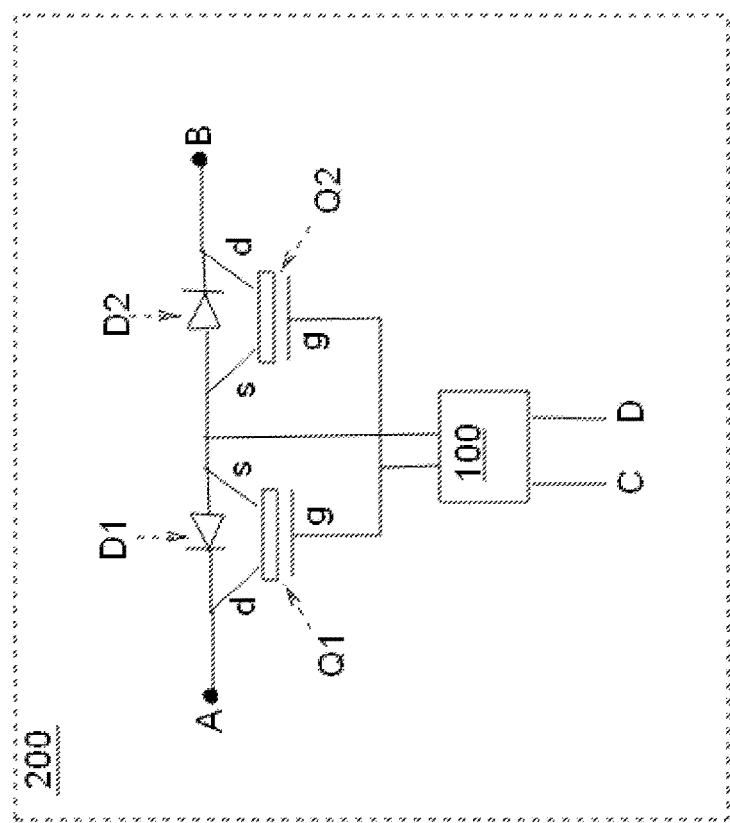
Figure 1: Principle of a fast, bidirectional power switch

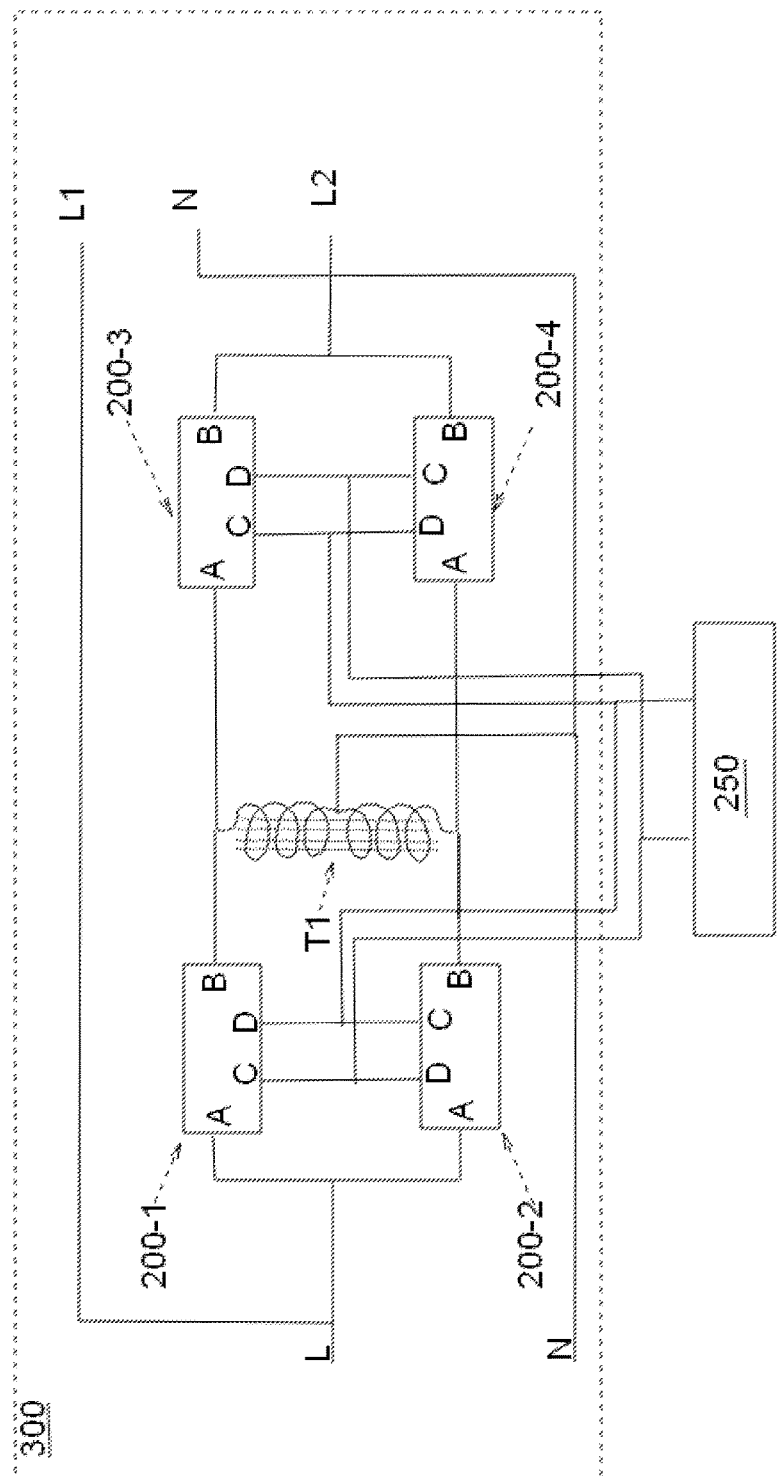
Figure 2: Solid-State phase-splitting power transformer principle

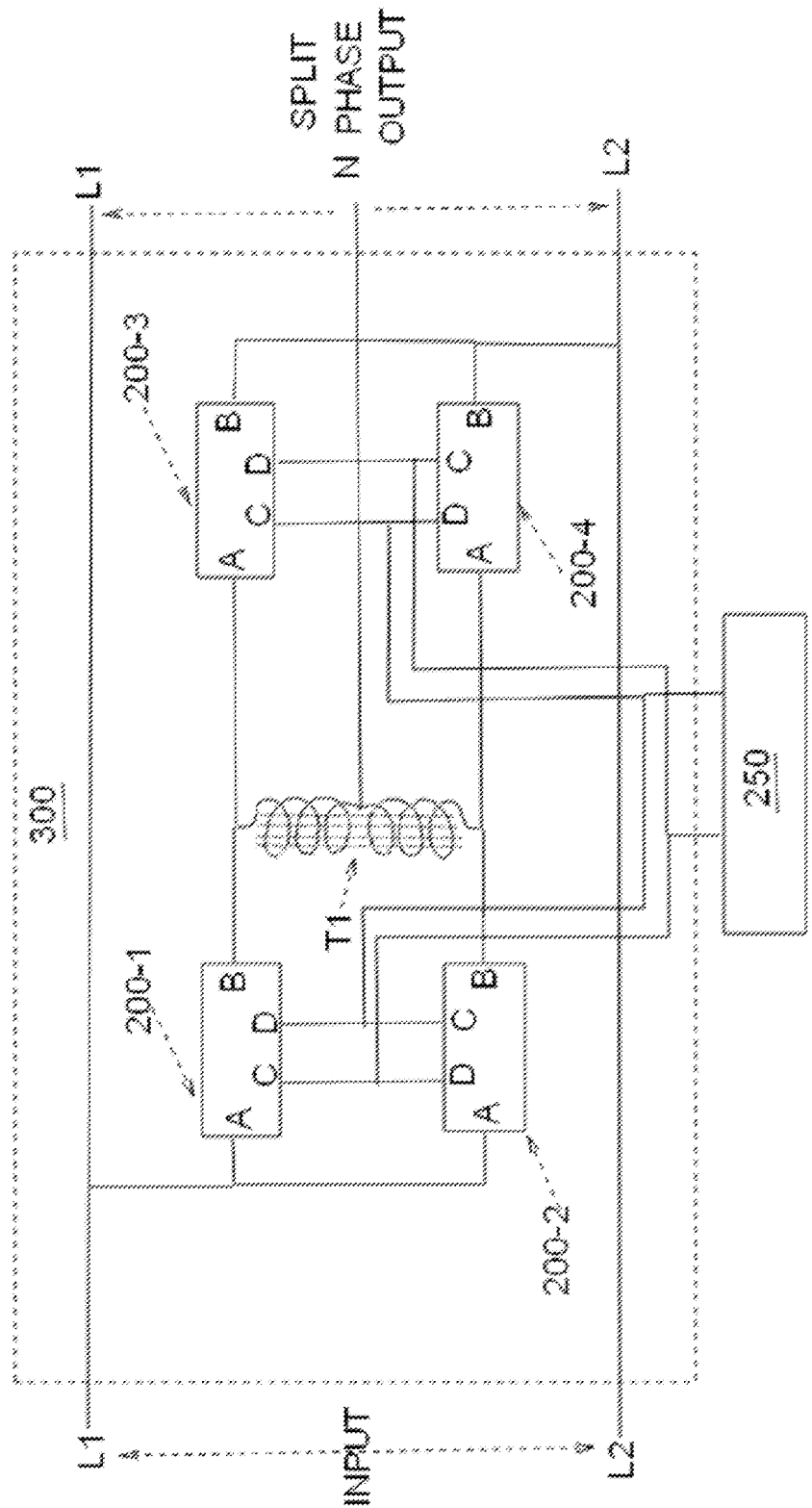
Figure 3: Generating an artificial neutral

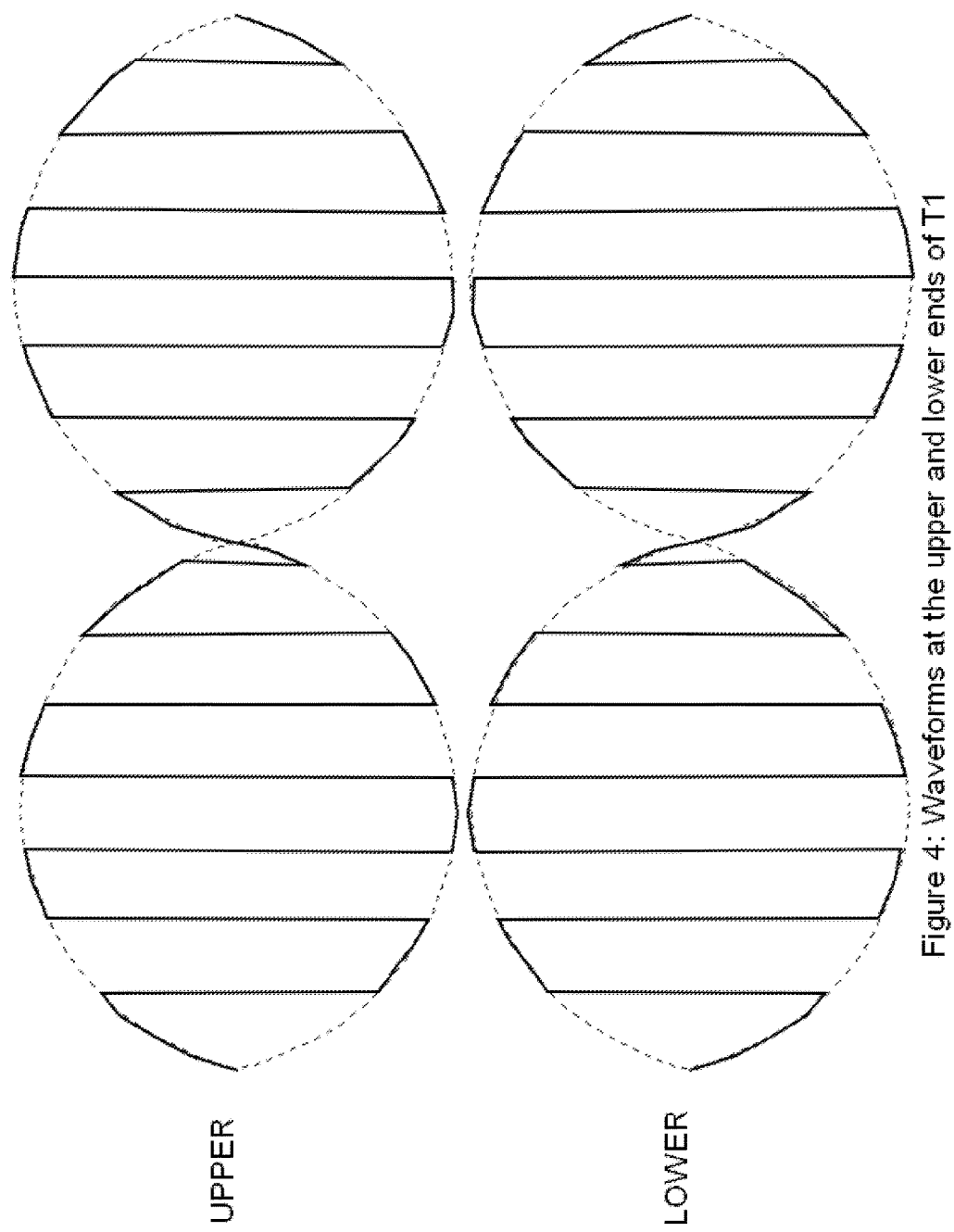

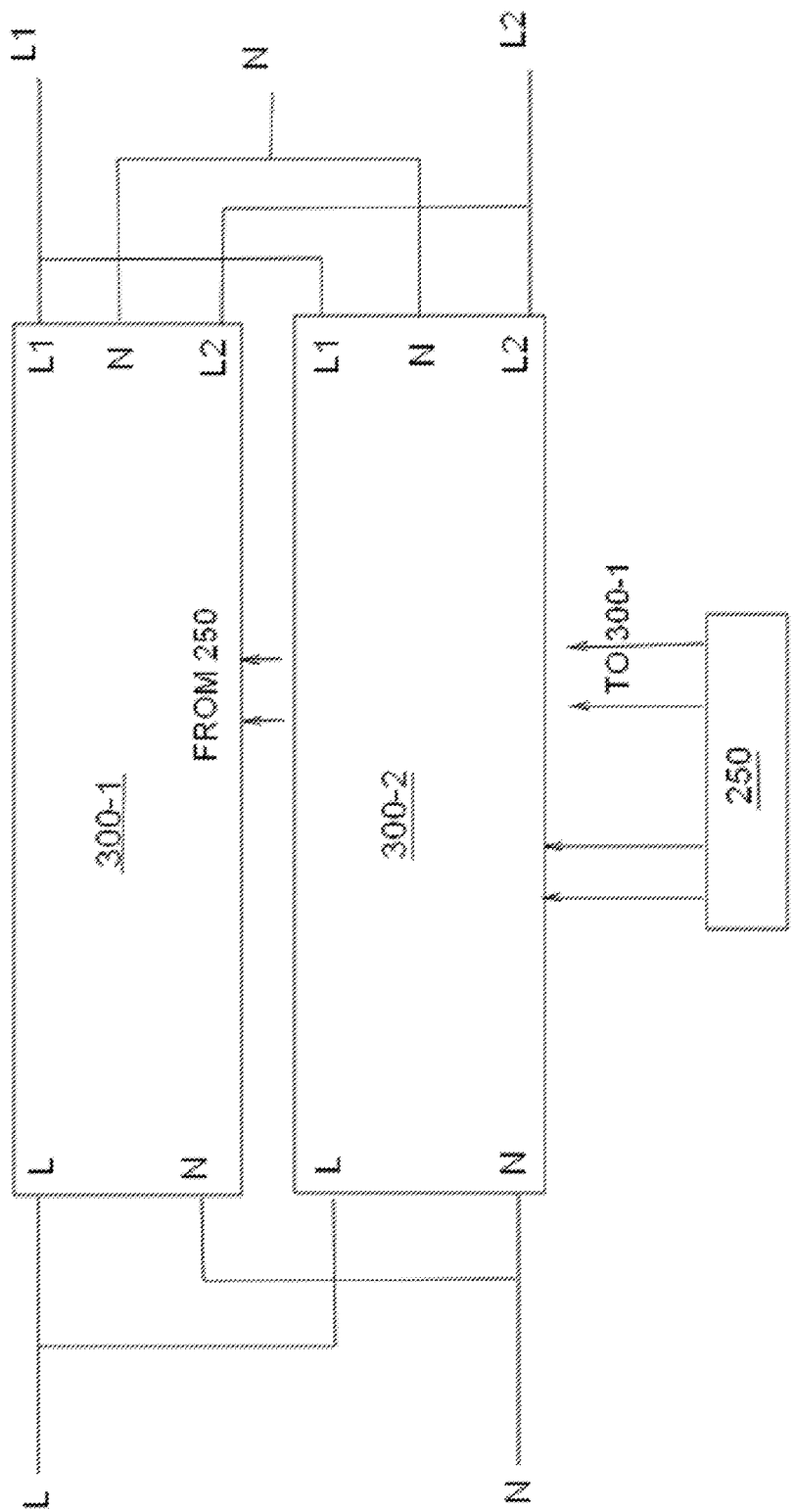
Figure 5: Parallel operation of phase-splitting transformers

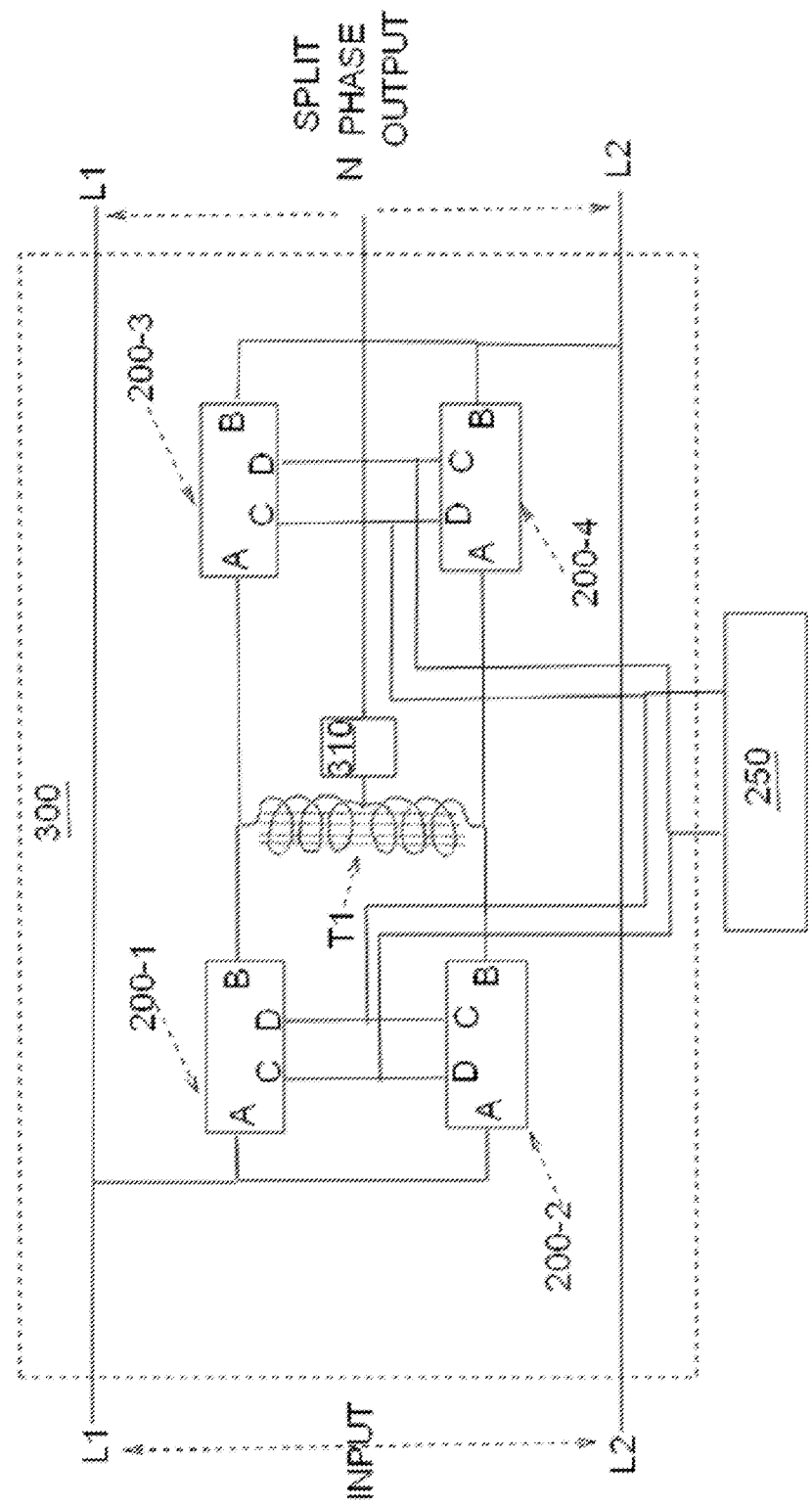
Figure 6: Measuring the current

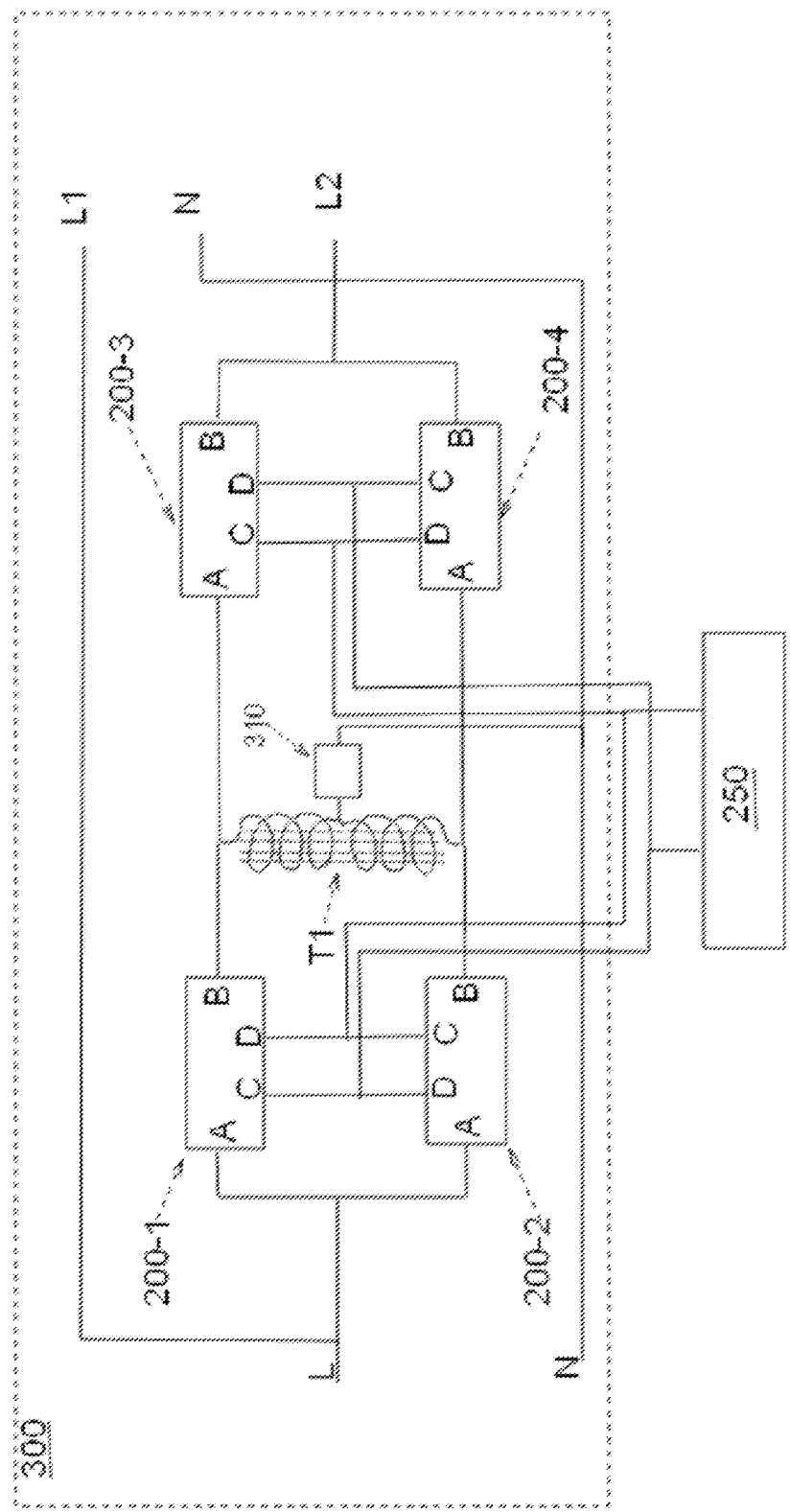
Figure 7: Current measurement

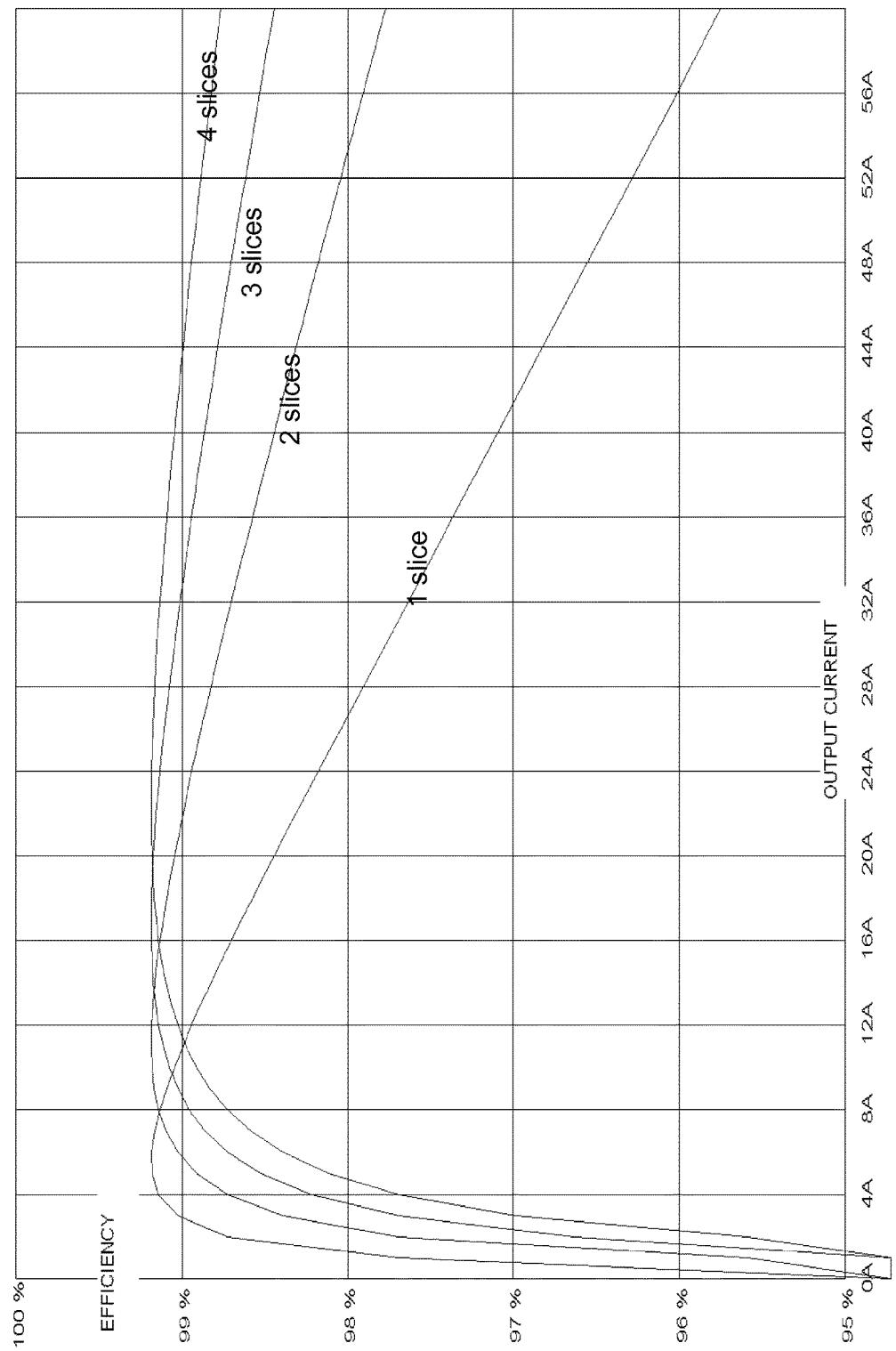
Figure 8: Efficiency versus output current

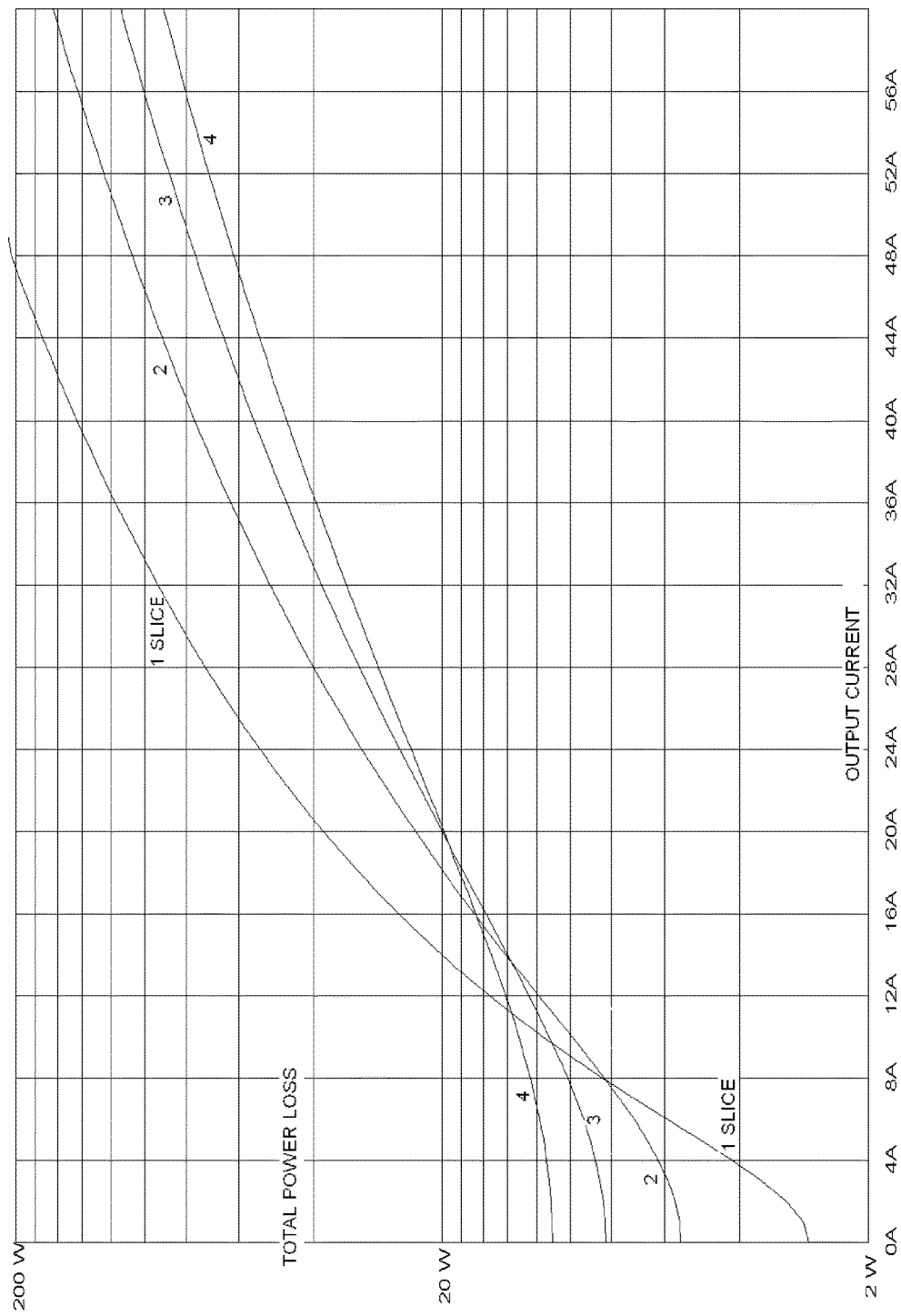
Figure 9: Total power loss versus output current

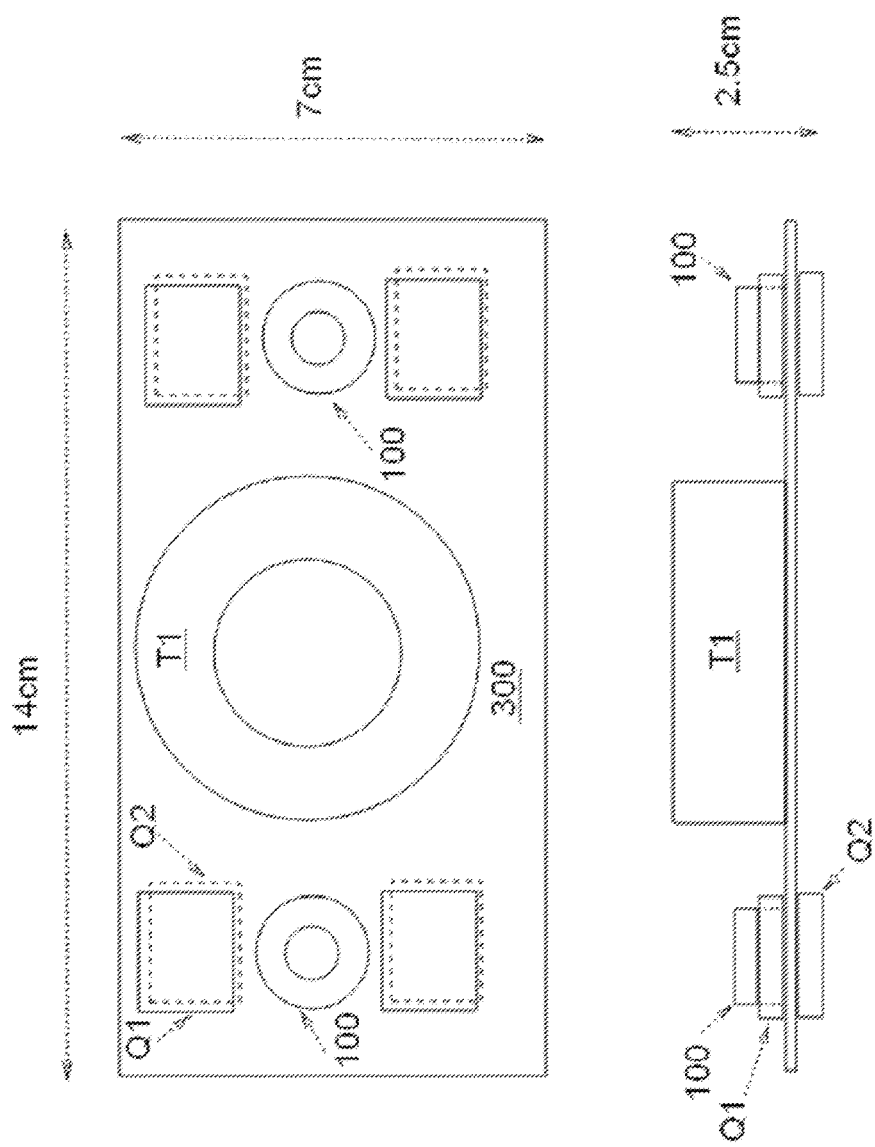
Figure 10: Component layout for one slice

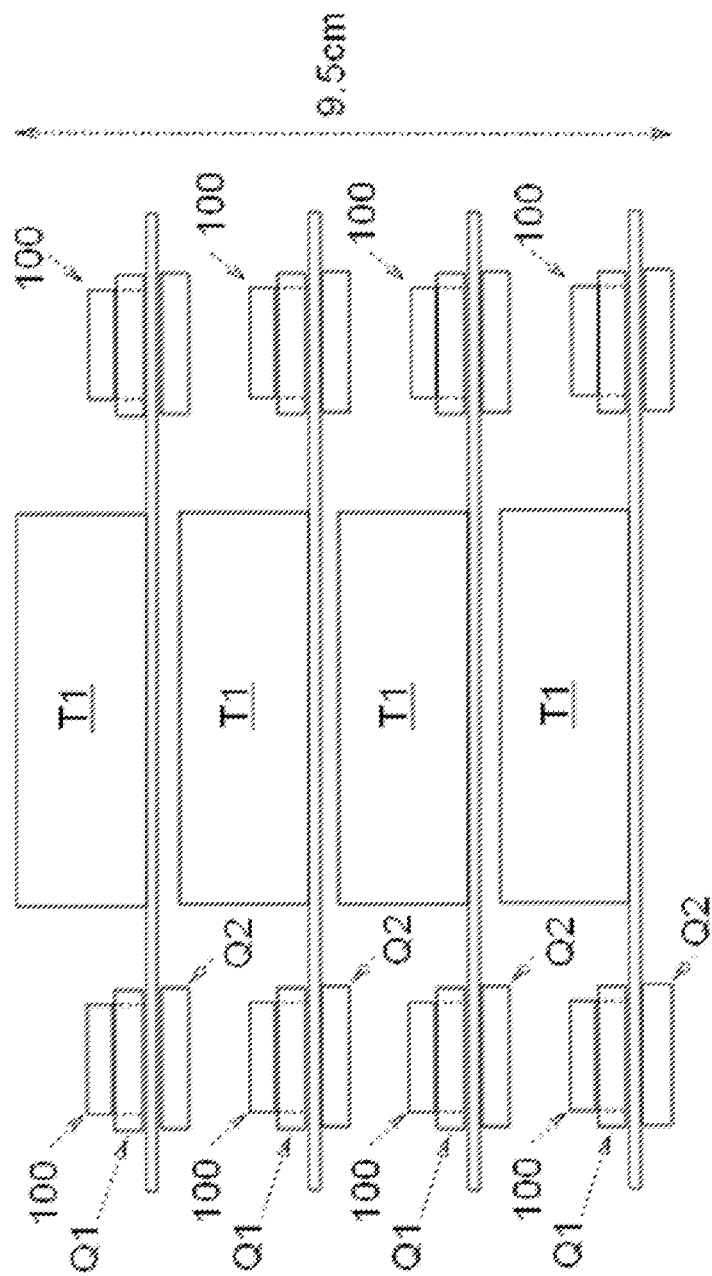
Figure 11: Stacking of four slices

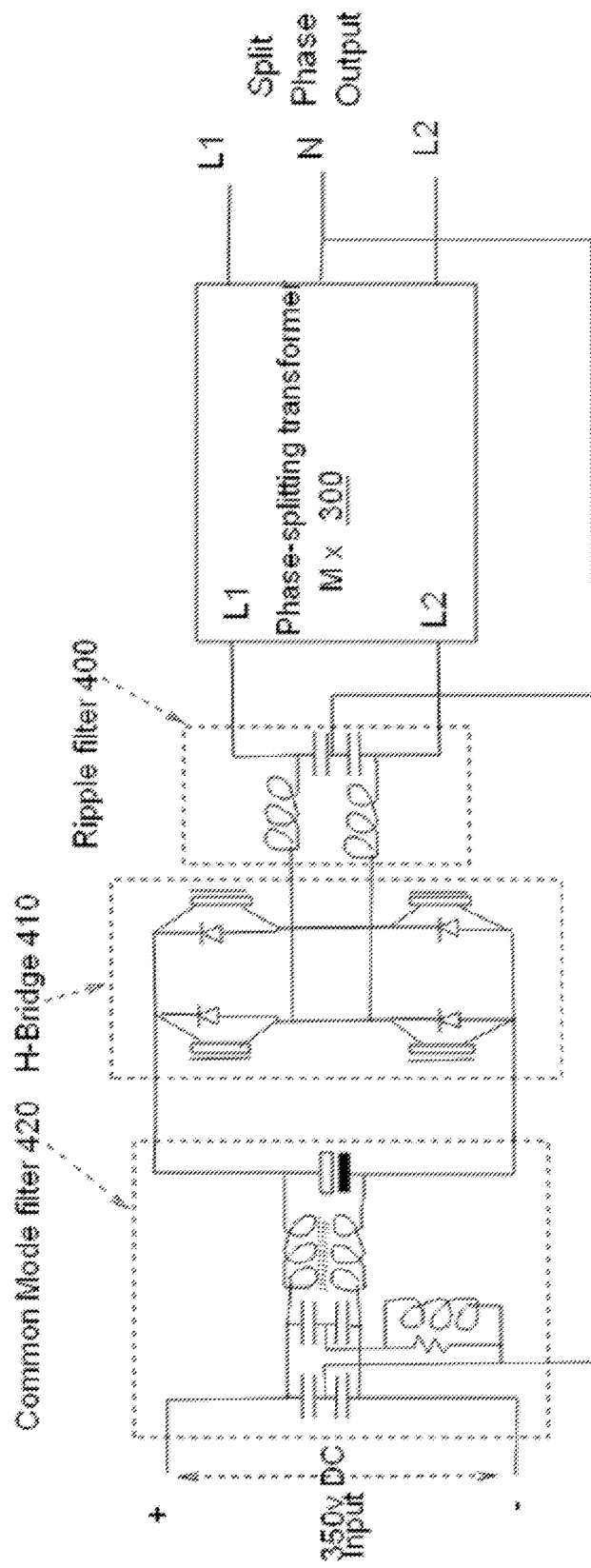
Figure 12: Inverter arrangement having split-phase output

SOLID-STATE PHASE SPLITTING TRANSFORMER

BACKGROUND

US residential 120/240 volt electrical installations use two, 180-degree anti-phase 120 volt supplies, either of which can power 120-volt loads, while 240-volt loads are powered by connecting them between the anti-phase 120-volt lines, giving 240 volts line-to-line. Such a supply is called a "split-phase" supply.

Sometimes, an alternative energy source may only provide a single phase 120 volt supply; the other phase then having to be generated from this single phase by use of a phase-inverting transformer, such as a center-tapped auto-transformer.

For example, a back-up supply using a single phase 120-volt inverter such as Xantrex type SW4048 may need a phase-inverting transformer to supply the other phase required for powering 240 volt loads.

Other inverters may provide a 240 volt floating supply and require a center-tapped auto-transformer to balance the 240 volts relative to ground to obtain the two anti-phase 120-volt hotlegs.

The size, weight and cost of the auto-transformers mentioned above rise with power rating, due to the need for large iron cores and many-turn, thick copper windings. Moreover, a conventional transformer entails a small, but still possibly significant, continuous power loss due to hysteresis in the iron core, even when there is no load. Therefore there is a need for alternative techniques to provide split-phase supplies from single-phase supplies with reduced size, weight, cost and no-load power loss.

SUMMARY

A solid-state phase-splitting power transformer in one implementation has line (L) and neutral (N) input terminals for a single phase power input relative to the neutral terminal and two line output terminals (L1,L2) for a split phase power output relative to the neutral terminal. Fast, bidirectional, solid-state switches are used to connect the line input terminal alternately at a high switching frequency to each end of a high frequency transformer which is center-tapped to neutral, thereby producing a high frequency signal which is double-sideband, suppressed-carrier (DSBSC) modulated with the single phase input waveform. The DSBSC signal is then synchronously demodulated using further bidirectional, solid-state switches to reproduce the input power waveform in anti-phase. The device accepts a wide range of frequency of operation, including down to zero frequency (DC), in which case a negative DC voltage output is produced if the input voltage is positive, or vice-versa. A high-power device according to the invention may be constructed using several lower-power devices in parallel, in which case the phase of the high-frequency switching waveforms may be advantageously staggered evenly over the range 0 to $2\pi$ to reduce unwanted spectral components at the output. The number of active parallel devices can be reduced at low output powers to reduce power loss at low or zero load by inhibiting switching of some of them.

A solid state phase-splitting transformer in a second implementation has two hot input terminals L1, L2 for connection of a floating voltage source, for example a 240-volt source, and creates a neutral terminal that splits the 240-volt input into two 120-volt outputs relative to neutral. The device in this implementation only has to deal with the power difference between the loads presented from L1 to Neutral and L2 to Neutral respectively.

BRIEF DESCRIPTION OF THE DRAWINGS

FIG. 1: Principle of a high-frequency bi-directional power switch
FIG. 2: Solid-State phase-splitting power transformer principle
FIG. 3: Generation of an artificial neutral
FIG. 4: DSBSC power waveforms
FIG. 5: Parallel operation of phase-splitting transformers
FIG. 6: Measuring the current
FIG. 7: Current measurement
FIG. 8: Efficiency versus output current graph
FIG. 9: Total power loss versus output current graph
FIG. 10: Component layout for one slice
FIG. 11: Stacking of multiple slices
FIG. 12: Inverter system with split-phase output

DETAILED DESCRIPTION

FIG. 1 illustrates an implementation based on MOSFETs of a fast, bidirectional, solid-state power switch suitable for the invention. Solid state devices other than MOSFETs may be used, such as TRIACs, SCRs, bipolar transistors, or Insulated Gate Bipolar Transistors (IGBTs). For brevity, the invention will be described in the context of using MOSFETs, but a person skilled in the art can easily adapt the invention to use other of the above-mentioned solid state devices based on the teachings herein. MOSFETs also have favorable characteristics, including the intrinsic diodes labeled D1 and D2 in FIG. 1, fast switching speed, and potential for lower voltage drops. Recent FET technologies such as Gallium Nitride (GaN) or Silicon Carbide (SiC) also can offer improved performance.

The switch of FIG. 1 accepts a power input waveform at terminal A and connects it through to terminal B when both MOSFETs (Q1 and Q2) are switched on. Since the circuit is symmetrical, terminals A and B are interchangeable. When both MOSFETs are turned off, the circuit blocks conduction in either direction and so can be used to pass or block electrical power of either polarity (+ or −), including power that alternates in polarity.

MOSFETs Q1 and Q2 include intrinsic diodes D1 and D2. When terminal A is more positive than terminal B and Q1 and Q2 are off, the sources (s) of Q1 and Q2 are not more than the forward voltage drop of D2 more positive than terminal B, while D1 is reverse biased and Q1 is non-conducting. When A is more negative than B (or B more positive than A) then the common sources (s) are not more than the forward voltage drop of D1 more positive than terminal A, while D2 is reverse biased and Q2 is non-conducting. Thus the device blocks in both directions when Q1 and Q2 are off.

Since the common sources (s) are at an indeterminate voltage, to turn Q1 and Q2 off, the drive voltage to their gates (g) relative to their sources (s) must be isolated using drive isolation circuit (100). For example, drive isolation circuit (100) may be a high frequency pulse transformer when the drive waveform is a high-frequency square wave that turns Q1 and Q2 on and off with 50:50 on/off ratio. Other isolation technologies, such as optoisolators, are also known in the art. Thus the on/off control for the bidirectional switch (200) may be applied between input terminals C and D of drive isolation circuit (100).

FIG. 2 shows using four of the bidirectional switches (200) of FIG. 1 to construct a phase-inverting power transformer.

Switches 200-1 and 200-2 have their input terminals (A) connected to a single-phase power terminal L and the switches are turned on and off by switching controller (250) at a high switching frequency such as 10 KHz to 100 KHz. The control terminals C and D of switch 200-1 are reverse-connected to terminals C and D of switch 200-2 such that when 200-1 is on, 200-2 is off and vice versa. Reversing connections C and D achieves this anti-phase switching behavior when isolation circuit (100) of FIG. 1 is an isolating pulse transformer or an opto-isolator, but with some other drive isolating technologies terminals C and D of switches 200-1 and 200-2 may have to be separately wired to associated terminals of switching controller (250), which would then be configured to supply anti-phase drive signals.

The output terminals (B) of switches 200-1 and 200-2 are connected to opposite ends of transformer T1, which is center-tapped to the neutral input terminal N.

Thus the power input voltage at terminal L is alternately applied to opposite ends of T1 at a high switching frequency, resulting in the waveforms of FIG. 4 at the upper and lower transformer ends. These waveforms no longer have their principal spectral components at the power line frequency, but rather at the high switching frequency and its harmonics. Effectively, the power line input frequency has been double-sideband suppressed carrier (DSBSC) modulated on to a high frequency carrier. This high frequency signal is now able to pass through a much smaller transformer using much less iron and copper than a power-frequency transformer. A suitable transformer T1 is a ferrite toroid, such as Magnetics Inc. part number 4916 in P or R material.

It can be seen that opposite ends of the transformer T1 have opposite polarity voltages at all times. Now switches 200-3 and 200-4 are switched at the same high switching frequency to demodulate the DSBSC waveform of FIG. 4 to reconstitute the power frequency waveform. If switch 200-3 is on when 200-1 is on and 200-4 is on when 200-2 is on, then the power frequency waveform will be reconstructed with no phase inversion. In other words, if 200-1 and 200-3 are both on together, then the voltage at input terminal L is passed to output terminal L2 and likewise when switch 200-2 and 200-4 are on. Therefore the voltage at terminal L is passed to output terminal L2 at all times, and not phase inverted. On the other hand, if switch 200-4 is on when 200-1 is on, and switch 200-3 is on when 200-2 is on, the opposite polarity one of the waveforms of FIG. 4 is demodulated and the opposite polarity of the voltage input to terminal L appears at output terminal L2. The connection of switching control signals C and D to switching controller (250) is shown reversed for switch 200-1 and 200-3 and for switches 200-2 and 200-4 to achieve this desired phase inversion. Thus at terminal L2, anti-phase power line frequency power is produced as compared with input terminal L, which is connected straight through to output terminal L1. The invention has thus produced split phase power from single phase power without the use of a large, iron-cored phase-splitting auto-transformer.

In another application, the same arrangement may be used with a floating 240 volt AC power input to split it into two, anti-phase, 120-volt outputs, as shown in FIG. 3. In this case, the two input terminals L1 and L2 are connected straight through to the output and the device operates to balance the floating input about a neutral terminal, which may be grounded, thus providing a split phase 120-0-120 volt supply relative to neutral or ground. It may be said that the device functions to create an artificial neutral.

FIG. 5 shows the connection of two "slices" in parallel, each slice being a phase-splitting transformer according to FIG. 2. Each slice operates to provide half of the total output current. High Frequency switching generator (250) now provides two sets of switch drive signals, one for slice 300-1 and another for slice 300-2. The two sets of drive signals are advantageously phase-staggered so that switching of one slice occurs between switching of the other slice, reducing output glitches. Since each slice has switches operating 180 degrees apart in the high frequency switching cycle, the two slices preferably operate 90 degrees apart, thereby creating four evenly-spaced switching events within each high frequency switching cycle. If four slices were operated in parallel, they would be preferably relatively phase-staggered in steps of 45 degrees. In general, operating N slices in parallel would preferably use switching phases staggered in steps of $\pi/N$, this creating 2N switching events equally spaced within each high frequency switching cycle.

An advantage of using multiple slices each operating at a lower current level is that some of them can be deactivated when the required output current is low, thereby reducing low-load and no-load power loss. In principle, this can also be done with iron-cored 50 or 60 Hz transformers by using relays, for example, to parallel a greater number of smaller transformers only when higher output currents are needed. To better understand how the idea of using multiple, lower current slices in parallel impacts favorably on performance, the losses within a slice according to FIG. 2 are now discussed.

Losses within unit (300) of FIG. 2 comprise four main parts:

1. The resistive losses of two switches (four transistors) 200-1 and 200-4 (or 200-2 and 200-3) in series. This equal to 4RdsON where RdsON is the ON resistance of a single MOSFET. There are various transistor technologies emerging that can reduce RdsON, and in particular Silicon Carbide (SiC) or Gallium Nitride (GaN) can now offer lower RdsON than conventional power MOSFETs. A state-of-the-art value for a 400-volt (at least) MOSFET is currently in the 15 milliohm to 17 milliohm region.

2. The hysteresis loss (core loss) of the transformer T1. This depends on the selection of the magnetic material, is proportional to the volume of the core, is proportional to the frequency to a power of between 1 and 2 and to the peak flux density to a power of between 2 and 3. Manufacturers of suitable toroidal cores such as Magnetics Inc. publish the exact formula for computing loss from flux density, frequency and core dimensions. There is a trade off within this element because the peak flux density reduces when the frequency is increased but increasing frequency causes more loss at the same flux density.

3. The copper loss. This depends on the length of the winding and the gauge of the wire. There is a trade off between the loss in (2) above and the copper loss, whereby the flux density reduces when the number of turns is increased, reducing the core loss, but the copper loss increases due to the longer winding length and the need to reduce the wire gauge to accommodate more turns. At frequencies in the 10 KHz to 100 KHz region, Litz wire should be used comprising interwoven strands of wire of radius less or comparable to the skin depth. 23 AWG wire is a suitable gauge for an individual strand.

4. The transistor switching loss. This is primarily the power that must be used to charge and discharge the transistor gates to the ON level of typically 10 volts at the high switching frequency. It is proportional to frequency and to total gate charge. There is a trade off with core loss, which tends to reduce at higher switching frequencies, and gate drive power, which tends to increase.

There are possibly other, smaller loss mechanisms, but the above four are the most important. All four of the above loss elements may be readily computed from component data. Moreover, loss elements (1) and (3) reduce in proportion to the square of current, and thus reduce proportionally with the square of the number of slices over which the current is split, while elements (3) and (4) increase proportionally to the number of slices, all else being equal.

To summarize, for a given desired total current output, state of the art transistors and magnetic core parameters, the losses are a function of three parameters: The number of slices connected in parallel; the number of turns of wire on the core and the consequent wire gauge, and the switching frequency. A computer program was written to explore this function of three variables and some typical results are shown below.

Component Data:
Toroidal core: Magnetics Inc. size 4916 in R material
Wire N strands of 23 AWG per strand
Transistors: RdsON=17 milliohms; total gate drive charge 336 nanocoulombs
Operating data: 120 volts rms in; total output current 30 amps rms

| | Number of slices = 1 | | | | | |
|---|---|---|---|---|---|---|
| Frequency | 22 T × 20 S | 20 T × 24 S | 18 T × 28 S | 16 T × 44 S | 15 T × 44 S | 14 T × 48 S |
| 60 KHz | 72.85 | 71.94 | 71.94 | 72.57 | 73.26 | 74.17 |
| 80 KHz | 72.46 | 71.27 | 70.84 | 70.83 | 71.05 | 71.91 |
| 100 KHz | 72.51 | 71.15 | 70.51 | 70.13 | 70.11 | 70.65 |
| 120 KHz | 72.05 | 71.69 | 70.97 | 70.5 | 70.41 | 70.84 |
| 140 KHz | 73.38 | 71.95 | 71.17 | 70.58 | 70.4 | 70.71 |
| 160 KHz | 73.77 | 72.29 | 71.45 | 70.77 | 70.52 | 70.76 |

| | Number of slices = 2 | | | | | |
|---|---|---|---|---|---|---|
| Frequency | 31 T × 10 S | 26 T × 14 S | 23 T × 18 S | 21 T × 22 S | 19 T × 26 S | 18 T × 30 S |
| 40 KHz | 46.7 | 44.98 | 45.6 | 47.08 | 50.03 | 52.07 |
| 60 KHz | 46.16 | 43.39 | 42.9 | 43.27 | 44.6 | 45.56 |
| 80 KHz | 46.54 | 43.32 | 42.35 | 42.24 | 42.87 | 43.37 |
| 100 KHz | 47.24 | 43.78 | 42.55 | 42.17 | 42.44 | 42.68 |
| 120 KHz | 48.38 | 44.91 | 43.65 | 43.23 | 43.43 | 43.6 |

| | Number of slices = 3 | | | | |
|---|---|---|---|---|---|
| Frequency | 31 T × 10 S | 26 T × 14 S | 23 T × 18 S | 21 T × 22 S | 19 T × 26 S |
| 40 KHz | 35.99 | 36.84 | 39.38 | 42.49 | 47.53 |
| 50 KHz | 35.3 | 35.17 | 36.67 | 38.75 | 42.28 |
| 60 KHz | 35.19 | 34.46 | 35.33 | 36.77 | 39.38 |
| 70 KHz | 35.38 | 34.26 | 34.71 | 35.72 | 37.73 |
| 80 KHz | 35.76 | 34.36 | 34.5 | 35.22 | 36.79 |
| 90 KHz | 36.25 | 34.64 | 34.57 | 35.06 | 36.32 |
| 100 KHz | 36.81 | 35.05 | 34.81 | 35.13 | 36.14 |
| 110 KHz | 37.86 | 36.17 | 35.98 | 36.34 | 37.38 |

| | Number of slices = 4 | | | | |
|---|---|---|---|---|---|
| Freq. | 33 T × 9 S | 30 T × 11 S | 27 T × 13 S | 25 T × 15 S | 24 T × 17 S |
| 40 KHz | 31.83 | 32.2 | 33.96 | 35.95 | 37.21 |
| 50 KHz | 31.24 | 31.08 | 32.07 | 33.34 | 34.24 |
| 60 KHz | 31.29 | 30.81 | 31.33 | 32.25 | 32.68 |
| 70 KHz | 31.68 | 30.99 | 31.2 | 31.73 | 32.06 |
| 80 KHz | 32.28 | 31.44 | 31.42 | 31.74 | 31.95 |
| 90 KHz | 33 | 32.05 | 31.87 | 32.03 | 32.14 |
| 100 KHz | 33.8 | 32.77 | 32.46 | 32.51 | 32.55 |

| | Number of slices = 5 | | | | |
|---|---|---|---|---|---|
| Freq. | 37 T × 7 S | 35 T × 8 S | 33 T × 9 S | 31 T × 10 S | 30 T × 11 S |
| 40 KHz | 30.18 | 29.92 | 30.18 | 30.93 | 31.34 |
| 50 KHz | 30.01 | 29.5 | 29.43 | 29.77 | 29.93 |
| 60 KHz | 30.43 | 29.76 | 29.49 | 29.59 | 29.6 |
| 70 KHz | 31.16 | 30.39 | 29.98 | 29.91 | 29.83 |
| 80 KHz | 32.07 | 31.22 | 30.73 | 30.54 | 30.38 |

| | Number of slices = 6 | | | | |
|---|---|---|---|---|---|
| Freq. | 44 T × 5 S | 40 T × 6 S | 37 T × 7 S | 35 T × 8 S | 33 T × 9 S |
| 35 KHz | 30.48 | 29.66 | 29.74 | 30.12 | 31.06 |
| 40 KHz | 30.44 | 29.35 | 29.16 | 29.3 | 29.94 |
| 45 KHz | 30.61 | 29.34 | 28.94 | 28.9 | 29.32 |
| 50 KHz | 30.94 | 29.51 | 28.96 | 28.79 | 29.04 |
| 55 KHz | 31.37 | 29.82 | 29.15 | 28.87 | 29 |
| 60 KHz | 31.88 | 30.24 | 29.46 | 29.1 | 29.12 |

In the above tables, nomenclature such as 44Tx5S means 44 turns of 5 strands of 23 AWG enameled copper wire in a Litz weave. The table entries reflect the total number of watts dissipation for the throughput of 120 volts at 30 amps, i.e. 3.6 kilowatts. The lowest loss in each table is highlighted in bold.

The efficiency is given by 100% x output power/input power, which, in the case of the optimum point in the last table is 99.2%, comparing favorably with a conventional iron-cored transformer of 3.6 KVA rating. The loss is seen to reduce as the number of slices is increased; however it is found to increase again beyond 6 slices with the above parameters. Another interpretation is that the efficiency is optimum at an output current of 5 amps per slice with the above component parameters. Therefore, if the output current needed were only 5 amps at a given moment, minimum loss would be obtained by operating only one slice.

The invention can comprise the refinement that the number of slices that are activated by enabling switching can be dynamically varied according to the output current demand, thus maintaining optimum efficiency over a wide current range. Gate drive generator (250) can include the ability to selectively inhibit switching of different slices in dependence on the total current required to be handled.

FIG. 6 illustrates where the current handled by the phase-splitting transformer of FIG. 3 is most appropriately measured. Since the device only has to provide the neutral current, which is the difference between the L1 and L2 output currents, current measuring device (310) is connected in the neutral line. In the connection of FIG. 2, the current flowing from line input L through T1 and out to neutral line N is the current to be handled by the phase splitting transformer. Therefore current measuring device (310) is also appropriately placed in the connection to the center tap of T1, as shown in FIG. 7.

When multiple slices are paralleled, each may comprise an independent current measuring device (310), all of which may couple the measured current to common gate drive generator (250). Gate drive generator (250) may then combine the measured currents from each slice to obtain a measurement of total current and then decide based on the total current which or how many slices to enable by supplying them with gate drive. Alternatively, the center taps of the transformer T1 of each slice can be brought out of each slice (300) and paralleled to be taken to neutral through a common current measuring device (310). Current measuring device (310) can be a toroidal core having a secondary winding, with the current to be measured taken through a wire passing through the center of the core, thus inducing a voltage in the secondary winding which may be A-to-D converted by a processor such as an ATMEGA1284PU or an AT TINY, which have internal A-to-D conversion. Such processors can also generate the required phase-staggered gate drive waveforms using suitable software, and selectively inhibit gate drive to those slices not needed to be active at the measured current level. As soon as a current sample from the A-to-D indicates that current has risen above a threshold however, further slices are activated within one cycle. Alternative current measuring devices such as a small series resistor or a Hall Effect device can be used if response is desired down to zero frequency (DC).

Consider a 4-slice device using the optimum parameters from the above tables, namely a 30Tx11S coil and a 60 KHz operating frequency. The efficiency may now be plotted versus output current for 1, 2, 3 or 4 slices operating, as shown in FIG. 8.

In FIG. 8 it may be seen that a single active slice provides greatest operating efficiency up to about 8 amps output; two slices provide greatest efficiency from 8 to 14 amps; 3 slices are best from 14 to 20 amps, and all four slices operating provide best efficiency above 20 amps. By selecting the number of slices to be active in dependence on the output current, the efficiency can be maintained over 99% between about 3 amps and 44 amps. When all four slices are operating, the efficiency is still just under 99% at 60 amps (7.2 Kw) output.

FIG. 9 shows the total power loss versus output current. Of interest in this graph is the power loss at zero current, that is, the no-load loss. It can be seen that the no-load loss is reduced to about 2.7 watts by operating only one slice at low currents. There are ways to further reduce the no-load loss if desired. For example, all slices do not have to be identical. A low-load slice could be fabricated with smaller transistors taking less gate drive, more turns on transformer T1 to reduce core loss, and/or to operate at a different frequency optimized for minimum no-load loss. However, since the no-load loss of FIG. 9 is already much smaller than the no-load loss that would be entailed by operating a second inverter to produce the anti-phase hotleg, it is considered adequate, and the production advantage of all slices being of identical design may be more important.

FIG. 10 shows a possible printed circuit board layout for one slice. To save board area, the two transistors (Q1,Q2) of each switch of FIG. 1 may be mounted on opposite sides of the board. Large copper areas may be used to conduct the high currents and provide transistor heat-sinking. One slice may thus be constructed in a volume of about 250 cc. FIG. 11 shows stacking four slices in a volume of less than 1000 cc. The common gate drive generator and current measuring device can be on a separate board or a motherboard into which slices can be plugged. By contrast, a comparable 5 KVA conventional iron-cored auto-transformer is approximately 10 cm×25 cm×14 cm, or 7000 cc and has a no-load power loss of around 10 watts.

FIG. 12 shows an advantageous use of the invention to provide a split-phase 120-0-120 volt RMS 60 Hz residential electrical supply from an inverter. Approximately 350-volts DC is supplied to the input at extreme left from a battery, such as an electric car battery. H-bridge 410 commutates the battery supply using pulse width modulation to supply a sine wave 240v RMS 60 HZ floating AC output into the L1,L2 terminals of phase-splitting transformer (300), which as indicated may contain M slices of FIG. 3 stacked as in FIG. 11. The commutation results in a common mode waveform on the battery conductors which is filtered with common mode filter (420), the rationale, operation and design of which are described more fully in U.S. patent application Ser. Nos. 14/062,884 and 14/740,972, both to current Applicant and both of which are hereby incorporated by reference herein in their enterities. The pulse width or other 2- or 3-level representation of the desired sinewave output waveform is smoothed using ripple filter 400 to present the 240v RMS sinewave to the L1,L2 input terminals of phase-splitting transformer (300).

While the above specification has disclosed a solid state transformer that is principally of envisaged to be used as an autotransformer to produce a split-phase supply from a single phase supply, a person skilled in the art will understand that reversing the L and N connections of the input of FIG. 2 can also give a voltage doubling mode, or since the device is bilateral, a voltage halving mode. Many other adaptations of the principle of converting a power frequency signal to a high frequency double-sideband suppressed-carrier signal for voltage conversion using smaller transformers can be devised by persons skilled in the art, and are considered to fall within the spirit and scope of the invention as defined by the attached claims.

I claim:

1. A device for producing an electrical power output voltage at an output terminal of desired phase relative to an electrical power input voltage applied at an input terminal, the device having high power efficiency, including:—

At least one module comprising:—

A transformer designed to operate at a carrier frequency much higher than the frequency of said electrical input and output voltages, said transformer having a first winding end, a second winding end and a center tap;

first and second bidirectional solid-state switches for alternately passing current from or blocking current flow from said input terminal to alternate winding ends of said transformer, the switches being configured to be controlled to allow current to flow from said input terminal to said first winding end or said second winding end alternately at said carrier frequency, and third and fourth bidirectional solid state switches for alternately passing current from or blocking current flow from said first transformer winding end and said second winding end to said output terminal, the switches being configured to be controlled to allow current flow to said output terminal from said first winding end or said second winding end alternately at said carrier frequency, said bidirectional solid state switches being controlled by a switching controller configured to control said first, second, third and fourth bidirectional solid-state switches such that said electrical power output voltage of said desired phase appears at said output terminal.

2. The device of claim 1 in which said frequency of said electrical input and output voltages is zero (DC).

3. The device of claim 1 in which said desired phase is 180 degrees out of phase with said input voltage.

4. The device of claim 1 in which said switching controller is common to and is configured to control the bidirectional switches of all of said at least one modules.

5. The device of claim 1 in which said input voltage at said input terminal is with respect to a neutral input terminal and said output voltage at said output terminal is with respect to an output neutral terminal, said input and output neutral terminals being connected together and connected through a current measuring device to the transformer center tap of at least one of said at least one modules, the current measurement being made available to be used by said switching controller to adaptively control switching to optimize power transfer efficiency at different measured current levels.

6. The device of claim 1 in which said switching controller controls the carrier frequency switching of different modules using different phases of the carrier signal, the phases being staggered as between different ones of said at least one module.

7. A device for producing substantially equal and opposite phase electrical power output voltages at a pair of output terminals relative to a neutral output terminal from a floating single phase supply applied at a pair of input terminals, the device having high power efficiency, including:—

At least one module comprising:—

A transformer designed to operate at a carrier frequency much higher than the frequency of said electrical input and output voltages, said transformer having a first winding end, a second winding end and a center tap, the center tap supplying current to said neutral output terminal, and first and second bidirectional solid-state switches connected between said first and second winding end respectively and a first of said pair of input terminals and third and fourth bidirectional solid-state switches connected between said first and second winding end respectively and the second of said pair of input terminals, said bidirectional solid state switches being controlled by a switching controller configured such that when said first and fourth switches pass current, said second and third switches block current flow, alternating at said carrier frequency with controlling said bidirectional solid state switches such that when said second and third switches pass current, said first and fourth switches block current flow.

8. The device of claim 7 in which said center tap supplies current to said neutral output terminal through a current measuring device the measured current being used by said switching controller to adapt switching such that the power transfer efficiency is optimized at different measured current levels.

9. The device of claim 7 in which said switching controller is common to and is configured to controls all of said bidirectional solid state switches in all of said at least one modules.

10. A method of efficiently producing an electrical power output signal of opposite phase to an electrical power input signal, comprising the steps of:—

Connecting said electrical power input signal to modulation circuitry for modulating said electrical power input signal on to a high carrier frequency to produce double-sideband, suppressed-carrier representation of said electrical power input signal, and connecting said double-sideband, suppressed-carrier representation of said electrical power input signal to synchronous demodulation circuitry for synchronously demodulating said double-sideband, suppressed-carrier representation of said electrical power input signal to obtain said electrical power output signal of opposite phase.

11. The method of claim 10 in which the step of connecting said electrical power input signal to modulation circuitry for modulating said electrical power input signal on to a high carrier frequency comprises using bidirectional power switches controlled to connect said electrical power input signal alternately at said carrier frequency to opposite ends of a center-tapped transformer designed to operate at said carrier frequency.

12. The method of claim 10 in which the step of connecting said double-sideband, suppressed-carrier representation of said electrical power input signal to synchronous demodulation circuitry for synchronously demodulating comprises using bidirectional power switches controlled to connect said double-sideband, suppressed-carrier representation alternately at said carrier frequency from opposite ends of a center-tapped transformer designed to operate at said carrier frequency to an output terminal to obtain electrical power output signal of opposite phase at said output terminal.

13. The method of claim 10 further comprising developing said double-sideband, suppressed-carrier signal representation of said electrical power input signal across the ends of a center-tapped transformer designed to operate at said carrier frequency and connecting the center tap to an input and output neutral terminal.

14. The method of claim 10 in which the step of connecting said electrical power input signal to modulation circuitry for modulating comprises using multiple double-sideband suppressed-carrier modulators operating with staggered phases of said carrier frequency to produce a representation of said electrical power input signal comprising multiple double-sideband, suppressed-carrier signals.

15. The method of claim 10 in which the step of connecting said double-sideband, suppressed-carrier representation of said electrical power input signal to synchronous demodulation circuitry for synchronously demodulating comprises connecting multiple double-sideband, suppressed-carrier signals to corresponding synchronous demodulators, the synchronous demodulators operating with staggered carrier phases.

16. The method of claim 10 in which the step of connecting said electrical power input signal to modulation circuitry for modulating comprises using multiple double-sideband suppressed-carrier modulators operating with staggered phases of said carrier frequency to produce a representation of said electrical power input signal comprising multiple double-sideband, suppressed-carrier signals, and the number of multiple double-sideband, suppressed-carrier modulators used is varied as a function of the magnitude of said electrical power output signal.

17. The method of claim 10 in which the step of connecting said double-sideband, suppressed-carrier representation of said electrical power input signal to synchronous demodulation circuitry for synchronously demodulating comprises connecting multiple double-sideband, suppressed-carrier signals to corresponding synchronous demodulators, the synchronous demodulators operating with staggered carrier phases, and the number synchronous demodulators used is varied as a function of the magnitude of said electrical power output signal.

\* \* \* \* \*